United States Patent
Krause-Heringer et al.

(10) Patent No.: US 7,297,364 B2
(45) Date of Patent: Nov. 20, 2007

(54) METHOD FOR REFURBISHING LAMP SURFACES

(75) Inventors: Alexander Krause-Heringer, Berkley, MI (US); Maurice Paperi, Macomb, MI (US)

(73) Assignee: The Magni Group, Inc., Birmingham, MI (US)

( * ) Notice: Subject to any disclaimer, the term of this patent is extended or adjusted under 35 U.S.C. 154(b) by 0 days.

(21) Appl. No.: 11/311,852

(22) Filed: Dec. 19, 2005

(65) Prior Publication Data

US 2007/0141242 A1    Jun. 21, 2007

(51) Int. Cl.
- *B05D 1/02* (2006.01)
- *B05D 3/02* (2006.01)
- *B05D 3/06* (2006.01)
- *B05D 3/12* (2006.01)

(52) U.S. Cl. .................. 427/140; 427/542; 427/164; 427/290; 427/427.4

(58) Field of Classification Search .................. None
See application file for complete search history.

(56) References Cited

U.S. PATENT DOCUMENTS

| | | |
|---|---|---|
| 3,822,158 A | 7/1974 | Hoffman et al. |
| 4,147,576 A | 4/1979 | Beem et al. |
| 4,247,580 A | 1/1981 | Chao |
| 4,497,755 A | 2/1985 | Korsyn |
| 4,510,001 A | 4/1985 | Speer |
| 4,588,619 A | 5/1986 | Fiscus et al. |
| 4,948,443 A | 8/1990 | Speer |
| 5,401,152 A | 3/1995 | Jacino et al. |
| 5,569,346 A | 10/1996 | Marshall |
| 5,955,113 A | 9/1999 | Jacino et al. |
| 6,106,648 A | 8/2000 | Butt |
| 2003/0047268 A1 | 3/2003 | Korchnak et al. |
| 2005/0208210 A1* | 9/2005 | Kuta ........................ 427/140 |

\* cited by examiner

*Primary Examiner*—William Phillip Fletcher, III
(74) *Attorney, Agent, or Firm*—Clark Hill PLC

(57) ABSTRACT

A method for refurbishing a surface of a lamp having surface damage includes the steps of removing the lamp from the motor vehicle. An original clear coat finish is removed from the surface of the lamp. The surface of the lamp is evened. Swirls and scratches are grinded out of the surface. The surface is then buffed and cleaned. A replacement clear coat material is sprayed over the surface of the lamp. The replacement clear coat material is then cured.

24 Claims, 3 Drawing Sheets

METHOD FOR REFURBISHING LAMP SURFACES

BACKGROUND ART

1. Field of the Invention

The invention relates generally to the refurbishing of lamp surfaces. More particularly, the invention relates to a method for removing surface wear and scratches in the lamp surface to return the lamp surface as near as possible to its original optical quality.

2. Description of the Related Art

When a motor vehicle is in an accident and a lamp is damaged, it is often times replaced. Lamps are very expensive parts to insure and replace. In many situations, the lamp is not broken; it is scratched severely enough to warrant the replacement thereof. The scratches affect the aesthetic quality of the lamp, as well as its performance. Scratches divert light from the direction in which the lamp is designed to emit light, reducing the performance of the lamp. In addition, some scratches in the lamp surface may misdirect enough light as to cause a distraction to those peripheral to the lamp.

U.S. patent application Ser. No. 10/804,435 published on Sep. 22, 2005 discloses a method for refurbishing a headlamp surface. This method includes multiple steps of grinding the headlamp surface in a constant movement and oscillating motion using a machine designed specifically this purpose. In addition, there is a constant supply of water that is poured over the headlamp surface as the headlamp surface is being refurbished. The water is used to remove debris from the headlamp surface and to cool the headlamp surface as it is being sanded. This method causes two problems. First, the water transmits the debris from the headlamp surface onto the vehicle creating an opportunity for the portion of the motor vehicle below the headlamp to be damaged by subsequently wiping down of the motor vehicle after the sanding is completed. Second, the water required to remove the debris and cool the headlamp surface spills onto the floor creating an adverse work environment. This method creates a messy environment that may increase the probability of workplace injuries due to a wet floor. Third, this method requires the use of a dedicated sanding device that cannot be used for any other purpose. And finally, this method of undesirable because it refurbishes the headlamp surface while the headlamp is still mounted to the motor vehicle. Grinding a headlamp surface while the headlamp is still mounted in the motor vehicle may cause damage to the motor vehicle. In particular, mistakes made by the operator of the method may accidentally grind the motor vehicle should the operator miscalculate forces being applied to the headlamp surface. Slipping while grinding is also a high probability given the amount of water on the floor directly below the headlamp assembly.

SUMMARY OF THE INVENTION

A method for refurbishing a surface of a lamp having surface damage includes the steps of removing the lamp from the motor vehicle. An original clear coat finish is removed from the surface of the lamp. The surface of the lamp is evened. Swirls and scratches are grinded out of the surface. The surface is then buffed and cleaned. A replacement clear coat material is sprayed over the surface of the lamp. The replacement clear coat material is then cured.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
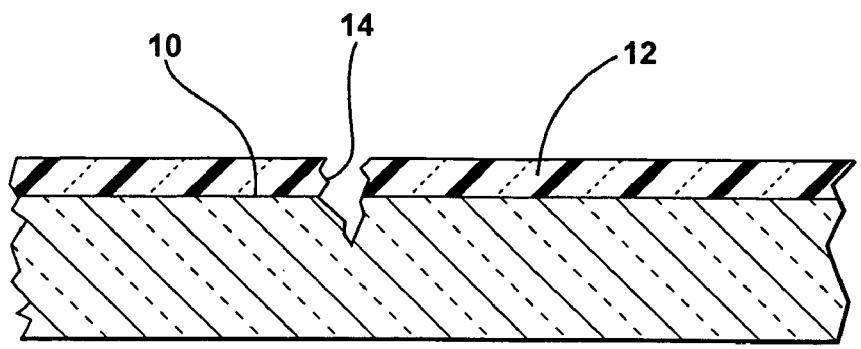
FIG. 1 is a cross-sectional side view, partially cut away, of a damaged lamp surface.
Figure 2:
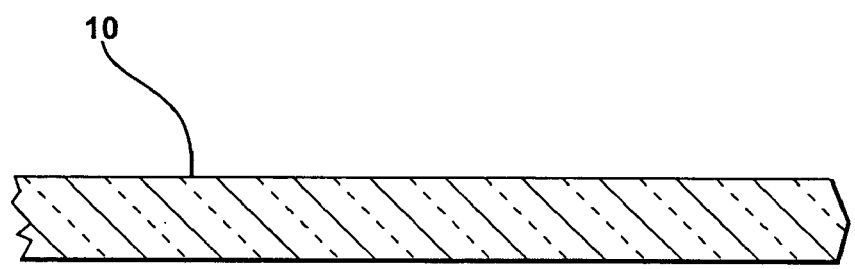
FIG. 2 is a cross-sectional side view, partially cut away, of a refurbished lamp surface.
Figure 3:
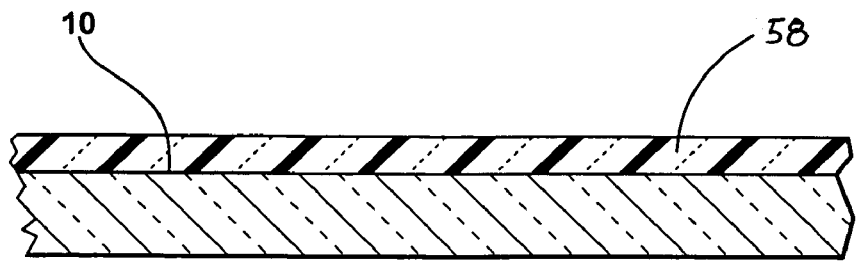
FIG. 3 is a cross-sectional side view, partially cut away, of a coated refurbished surface.

Referring to FIG. 1, a cross-sectional view, partially cut away, of a lamp surface 10 is shown to have an original clear coat surface 12. For purposes of this discussion, the reference to "original" means the clear coat surface at the time that damage occurs. It should be appreciated by those skilled in the art that a lamp surface 10 may be refurbished more than once in which case clear coat surfaces intermediate in time may be referred to as the original clear coat surface 12 for purposes of this discussion. The lamp surface 10 includes damage 14. The damage 14 is a scratch that extends through the original clear coat surface 12 and into the lamp surface 10. The damage 14 may be any type of damage that does not extend through the entire depth of the lamp surface 10.

Figure 4:
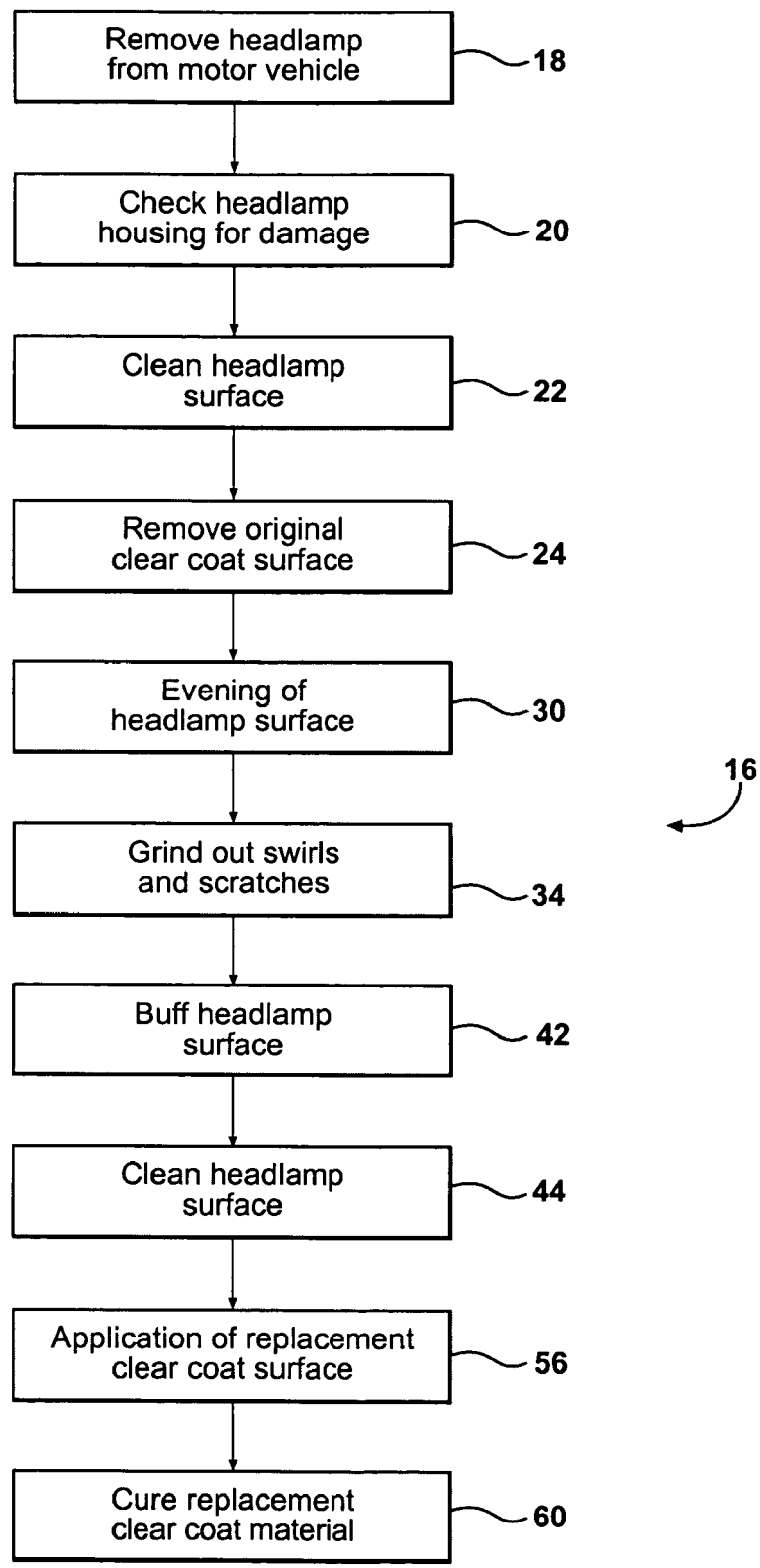
FIG. 4 is a logic chart of an overall process incorporating the inventive method.

Referring to FIG. 4, the inventive method designed to remove the damage 14 from the lamp surface 10 is generally indicated at 16. The inventive method 16 is a method for refurbishing the lamp surface 10 of a lamp that has the surface damage 14. The method begins at 18 with the removal of the lamp from the motor vehicle at 18. Once removed, the housing and tabs thereof are checked for damage at 20. The housing is checked for damage because the lamp is going to be placed into a jig for subsequent refurbishing. If the lamp housing is damaged, the jig may further damage the housing rendering refurbishing process unnecessary. Once it has been determined that the lamp housing is intact, the lamp surface 10 is cleaned at 22. The original clear coat surface 12 of the lamp surface 10 is cleaned using a steaming process that steams the clear coat surface 12 using a solution with a primary ingredient of sodium laureth sulphate and a secondary ingredient of ammonium lauryl sulphate.

Once cleaned, the clear coat surface 12 and any exposed lamp surface 10 are dried of the solvent using high pressure air that is blown over the clear coat surface 12 and the lamp surface 10.

Figure 5:
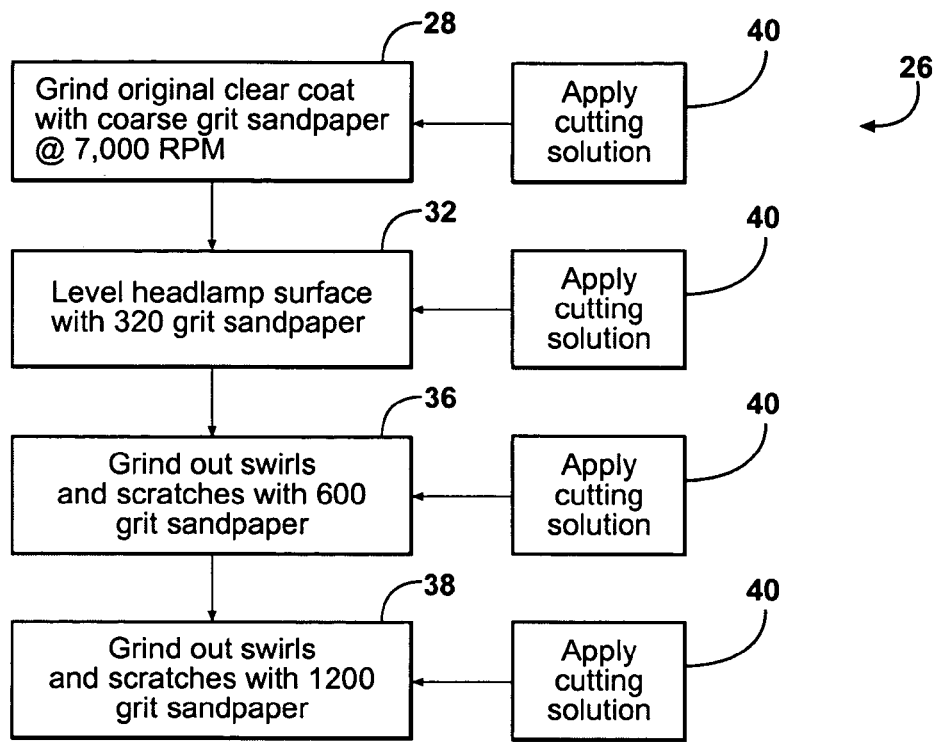
FIG. 5 is a logic chart of the grinding process of the inventive method.

The original clear coat surface 12 is then removed at 24. Referring to FIG. 5, a more detailed view of the removal of the original clear coat surface 24 is generally shown at 26. The removal of the original clear coat finish 12 starts with a step of grinding the clear coat finish with a course grit sandpaper at 28. In the preferred embodiment, the range of grit for the step of grinding the original clear coat finish is in the range of 320 and 240 grit. If the damage 14 is severe, the courser grit sandpaper, e.g., 240 grit sandpaper, can be used. If the damage 14 is minimal, the lower grade of course sandpaper, e.g., 320 sandpaper, may be used. A mini angle grinder is used to remove the original clear coat finish 12. The mini angle grinder would incorporate the use of a three inch foam loop pad along with the course grit sandpaper. The mini angle grinder rotates the course grit sandpaper at approximately 7000 revolutions per minute. When grinding the original clear coat finish 12, a halo effect will be created differentiated between the different thicknesses of the original clear coat finish 12 as it is being ground off the lamp surface 10. Thus, it can be confirmed that the original clear coat finish 12 is fully removed from the lamp surface 10 when the halo effect approaches the edges of the lamp surface 10. If the lamp surface 10 has deeper scratches, additional work in localized areas may be needed to more fully remove the scratch from the lamp surface 10. Once the original clear coat finish 12 is removed and the damage 14 is removed from the lamp surface 10, subsequent steps may be taken to prepare the lamp surface 10 for restoring it to its original equipment condition.

After the damage 14 has been removed, the lamp surface 10 is evened at 30. Referring back to FIG. 5, the evening of the lamp surface 10 includes the step of grinding the lamp surface 10 with a sandpaper having a grit of approximately 320, at 32. The lamp surface 10 is smoothed out as much as possible so that, if any troughs are created through the removal of the damage 14, they are minimized. The resulting lamp surface 10 will be substantially similar to the contour of the original lamp surface 10.

In the step of evening out the lamp surface 10, scratches and swirls may be created in the lamp surface 10. The next step of the inventive method 16 is to grind the swirls and scratches out of the lamp surface 10. This is done at step 34 in FIG. 4. Referring again to FIG. 5, the grinding out of the swirls and scratches is shown at 36 to be done with a sandpaper having a grit of approximately 600 grit. Once the use of 600 grit sandpaper has been completed, the step of removing the swirls and scratches continues with grinding out the swirls and scratches using a second sandpaper having a grit of approximately 1200 grit at 38. This further removes any swirls and scratches that may remain or that were created from the use of the 600 grit sandpaper in step 36.

All through the grinding steps of FIG. 5, a cutting solution is applied to each of the sandpapers and is used to absorb thermal energy during the steps of grinding. This is shown graphically at step 40. The cutting solution is water mixed with a generic detergent. This is not a free flowing solution, but one that is applied and absorbed by the sandpaper so that it is present during the grinding process. It does not create a flowing stream of cutting solution that drips over a jig or other holding device that would be used to hold the lamp while the lamp surface 10 is being ground. The application of the cutting solution is done on an add-need basis. It may be that one or more of the steps of FIG. 5 do not include the application of the cutting solution because the damage is not so great that it requires sanding to the point that it generates thermal energy that might damage the lamp surface 10.

Returning to FIG. 4, the lamp surface 10 is buffed at 42. The buffing includes the use of a wool buffing pad, followed by the use of a foam pad.

Figure 6:
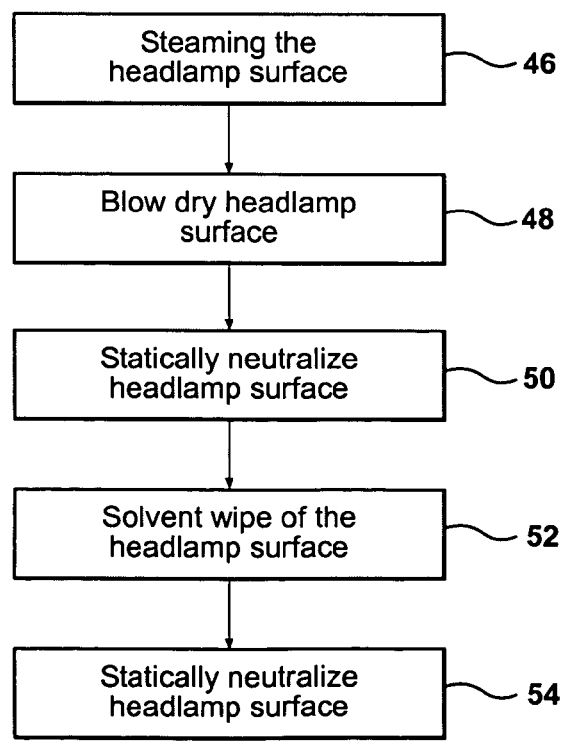
FIG. 6 is a logic chart of the cleaning process of the inventive method.

Subsequent to buffing, the lamp surface 10 is cleaned at 44. Referring to FIG. 6, the step of cleaning the lamp 44 is generally indicated. The cleaning process starts with the steaming of the lamp surface 10 at 46. The lamp is then blown dry at 48. To further clean the lamp surface 10, the lamp surface 10 is statically neutralized at 50. By neutralizing the lamp surface 10 to all static energy, particulate from the grinding and buffing steps may be more easily removed. A solvent is applied to the lamp surface 10 at 52 whereafter the lamp surface 52 is statically neutralized for a second time at 54.

Returning attention to FIG. 4, the inventive method 16 continues with the application of a replacement clear coat material over the lamp surface 10 at 56. The application of the replacement clear coat is applied using a spraying technology to evenly coat the lamp surface 10 with the replacement clear coat 58.

Once applied, the replacement clear coat material 58 is cured at 60. The curing process 58 is done by having the replacement clear coat surface 58 receive infrared radiation. The material used to create the replacement clear coat surface 58 is sold by assignee under the trademark MAGNI 700, which requires enough infrared radiation typically found in an oven at a temperature of 230° F. ±40° F. for approximately 45 minutes to 60 minutes. An ultraviolet radiation cure could also be used to cure the MAGNI 700 material. Once cured, the lamp surface 10 and replacement clear coat surface 58 are in a condition for sale as a refurbished lamp having optical characteristics which are very similar to those of the original equipment lamp assembly.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A method for refurbishing a lamp surface of a lamp having surface damage, the method comprising the steps of:
   removing the lamp from a motor vehicle;
   removing an original clear coat finish from the lamp surface of the lamp;
   evening the lamp surface;
   grinding swirls and scratches out of the lamp surface;
   buffing the lamp surface;
   cleaning the lamp surface;
   spraying a replacement clear coating material over the lamp surface; and
   curing the replacement clear coat material.

2. A method as set forth in claim 1 wherein the step of removing the original clear coat finish includes the step of grinding the original clear coat finish with course grit sandpaper.

3. A method as set forth in claim 2 wherein the step of grinding the original clear coat finish using the course sandpaper in the range of approximately 320 and 240 grit.

4. A method as set forth in claim 3 wherein the step of grinding the original clear coat finish includes the step of rotating the sandpaper at a speed of about 7000 revolutions per minute.

5. A method as set forth in claim 2 wherein the step of evening the lamp surface includes the step of grinding the lamp surface with a sandpaper having a grit of approximately 320 grit.

6. A method as set forth in claim 5 wherein the step of grinding swirls and scratches out of the lamp surface includes the step of grinding the lamp surface with a sandpaper having a grit of approximately 600 grit.

7. A method as set forth in claim 6 wherein the step of grinding swirls and scratches out of the lamp surface further includes the step of grinding the lamp surface with a sandpaper having a grit of approximately 1200 grit after grinding the lamp surface with the sandpaper having the grit of approximately 600 grit.

8. A method as set forth in claim 7 including the step of applying a cutting solution to all of the sandpaper to absorb thermal energy created as a byproduct during the steps of grinding.

9. A method as set forth in claim 8 wherein the step of buffing the lamp surface includes the step of buffing the lamp surface with a wool buffing pad.

10. A method as set forth in claim 9 wherein the step of buffing further includes the step of buffing with a foam pad.

11. A method as set forth in claim 10 wherein the step of curing the replacement clear coat material includes the step of applying infrared radiation to the lamp surface.

12. A method as set forth in claim 11 wherein the step of applying infrared radiation includes the step of heating the lamp in an oven.

13. A method for refurbishing a lamp surface of a lamp having surface damage, the method comprising the steps of:
    removing the lamp from the motor vehicle;
    removing an original clear coat finish from the lamp surface of the lamp;
    evening the lamp surface;
    grinding swirls and scratches out of the lamp surface;
    buffing the lamp surface;
    cleaning the lamp surface;
    statically neutralizing debris on the lamp surface to facilitate the removal of all of the debris on the lamp surface;
    spraying a replacement clear coating material over the lamp surface; and
    curing the replacement clear coat material.

14. A method as set forth in claim 13 wherein the step of cleaning the lamp surface includes the step of applying a solvent to the lamp surface to remove the debris from the lamp surface.

15. A method as set forth in claim 14 wherein the step of curing the replacement clear coat material includes the step of applying infrared radiation to the lamp surface.

16. A method as set forth in claim 15 wherein the step of applying infrared radiation includes the step of heating the lamp in an oven.

17. A method as set forth in claim 16 wherein the step of removing the original clear coat finish includes the step of grinding the original clear coat finish with course grit sandpaper.

18. A method as set forth in claim 17 wherein the step of grinding the original clear coat finish includes the step of rotating the sandpaper at a speed of about 7000 revolutions per minute.

19. A method as set forth in claim 18 wherein the step of evening the lamp surface includes the step of grinding the lamp surface with a sandpaper having a grit of approximately 320 grit.

20. A method as set forth in claim 19 wherein the step of grinding swirls and scratches out of the lamp surface includes the step of grinding the lamp surface with a sandpaper having a grit of approximately 600 grit.

21. A method as set forth in claim 20 wherein the step of grinding swirls and scratches out of the lamp surface further includes the step of grinding the lamp surface with a sandpaper having a grit of approximately 1200 grit after grinding the lamp surface with the sandpaper having the grit of approximately 600 grit.

22. A method as set forth in claim 21 including the step of applying a cutting solution to all of the sandpaper to absorb thermal energy during the steps of grinding.

23. A method as set forth in claim 12 wherein the step of curing the replacement clear coat material includes the step of applying ultraviolet radiation to the lamp surface after the step of heating the lamp in an oven.

24. A method as set forth in claim 16 wherein the step of curing the replacement clear coat material includes the step of applying ultraviolet radiation to the lamp surface after the step of heating the lamp in an oven.

* * * * *